US010804991B2

United States Patent
Zhang et al.

(10) Patent No.: US 10,804,991 B2
(45) Date of Patent: Oct. 13, 2020

(54) METHODS AND APPARATUS TO SUPPORT MOBILITY THROUGH BEAM TRACKING IN NEW RADIO ACCESS SYSTEM

(71) Applicant: MEDIATEK Singapore Pte. Ltd., Singapore (SG)

(72) Inventors: Yuanyuan Zhang, Beijing (CN); Chia-Hao Yu, Yilan County (TW); Pavan Santhana Krishna Nuggehalli, Mountain View, CA (US)

(73) Assignee: MediaTek Singapore Pte Ltd, Singapore (SG)

( * ) Notice: Subject to any disclaimer, the term of this patent is extended or adjusted under 35 U.S.C. 154(b) by 0 days.

(21) Appl. No.: 16/140,838

(22) Filed: Sep. 25, 2018

(65) Prior Publication Data
US 2019/0028170 A1    Jan. 24, 2019

Related U.S. Application Data

(63) Continuation of application No. PCT/CN2016/084687, filed on Jun. 3, 2016.

(51) Int. Cl.
*H04B 7/06* (2006.01)
*H04B 7/022* (2017.01)
(Continued)

(52) U.S. Cl.
CPC ........... *H04B 7/0626* (2013.01); *H04B 7/022* (2013.01); *H04B 7/0619* (2013.01);
(Continued)

(58) Field of Classification Search
CPC .... H04B 7/0626; H04B 7/022; H04B 7/0619; H04B 7/0695; H04B 7/088; H04W 76/10
See application file for complete search history.

(56) References Cited

U.S. PATENT DOCUMENTS

| 2005/0130664 | A1* | 6/2005 | Sang | H04Q 7/20 |
| 2009/0028091 | A1* | 1/2009 | Dimou | H04W 48/20 |

(Continued)

FOREIGN PATENT DOCUMENTS

| CN | 102882612 A | 7/2011 |
| CN | 104956606 A | 1/2013 |

(Continued)

OTHER PUBLICATIONS

International Search Report and Written Opinion of International Search Authority for PCT/CN2016/084687 dated Feb. 22, 2017 (11 pages).

(Continued)

*Primary Examiner* — Ronald B Abelson
(74) *Attorney, Agent, or Firm* — Imperium Patent Works; Helen Mao

(57) ABSTRACT

Methods and apparatus are provided for mobility support through beam tracking in the new radio access system. In one novel aspect, one or more beam-sets are configured for fast beam tracking. Each beam-set includes one or more multiple beams or transmit-receive points (TRPs). The UE performs the mobility support through lower layer based on one or more configured beam-sets. The lower layer can be a MAC layer or a PHY layer. In one embodiment, a channel status information (CSI) set and a transmission set are configured. The UE performs CSI measurements on all beams of the CSI set for potential beam tracking and data transmitting and receiving, and control signaling through one or more beams of the transmission set. In another embodiment, the UE further configures a candidate set. The beam-sets can be configured by the network or by the UE.

17 Claims, 13 Drawing Sheets

(51) Int. Cl.
*H04B 7/08* (2006.01)
*H04W 76/10* (2018.01)
*H04W 72/04* (2009.01)

(52) U.S. Cl.
CPC .......... *H04B 7/0695* (2013.01); *H04B 7/088* (2013.01); *H04W 76/10* (2018.02); *H04W 72/046* (2013.01)

(56) References Cited

U.S. PATENT DOCUMENTS

| | | | |
|---|---|---|---|
| 2010/0056171 | A1 | 3/2010 | Ramprashad et al. ...... 455/452.1 |
| 2011/0269481 | A1* | 11/2011 | Halfmann .............. H04W 24/00 |
| 2014/0112184 | A1 | 4/2014 | Chai .............................. 370/252 |
| 2015/0003325 | A1* | 1/2015 | Sajadieh .............. H04B 7/0626 |
| 2015/0003543 | A1 | 1/2015 | Shirani-Mehr et al. ...... 375/260 |
| 2015/0334769 | A1 | 11/2015 | Kim et al. ................... 370/329 |
| 2015/0382205 | A1* | 12/2015 | Lee ....................... H04W 16/28 |
| 2016/0029358 | A1 | 1/2016 | Hou et al. .................... 370/329 |
| 2016/0119910 | A1 | 4/2016 | Krzymien et al. ........... 370/329 |
| 2016/0344519 | A1 | 11/2016 | Lin et al. ..................... 370/213 |
| 2017/0164211 | A1 | 6/2017 | Ho et al. ...................... 370/329 |

FOREIGN PATENT DOCUMENTS

| | | |
|---|---|---|
| CN | 105532060 A | 9/2013 |
| CN | 104955061 A | 9/2015 |
| EP | 1562306 A1 | 8/2005 |
| TW | 201705711 A | 2/2017 |
| TW | 201722099 A | 6/2017 |
| TW | 201740696 A | 11/2017 |
| WO | WO2010025148 A1 | 3/2010 |
| WO | WO2014116928 A1 | 7/2014 |
| WO | WO2014139174 A1 | 9/2014 |
| WO | WO2014210493 A1 | 12/2014 |
| WO | WO2015080645 A1 | 6/2015 |
| WO | WO2015080648 A1 | 6/2015 |
| WO | WO2016062292 A1 | 4/2016 |
| WO | WO2017095467 A1 | 6/2017 |

OTHER PUBLICATIONS

Taiwan IPO, office action for the TW patent application 106118242 (no English translation is available) dated May 15, 2018 (8 pages).
Malte Schellmann, Huawei ERC, "ICT-317669-METIS/D2.4 Project Name; Mobile and wireless communications Enabler for the Twenty-twenty Information Society (METIS)", the whole document.
EPO, search report for the EP patent application 16903554.0 dated Sep. 27, 2019 (11 pages).
SIPO, search report for the CN patent application 201680004292.3 (no English translation is available) dated May 29, 2020 (10 pages).

* cited by examiner

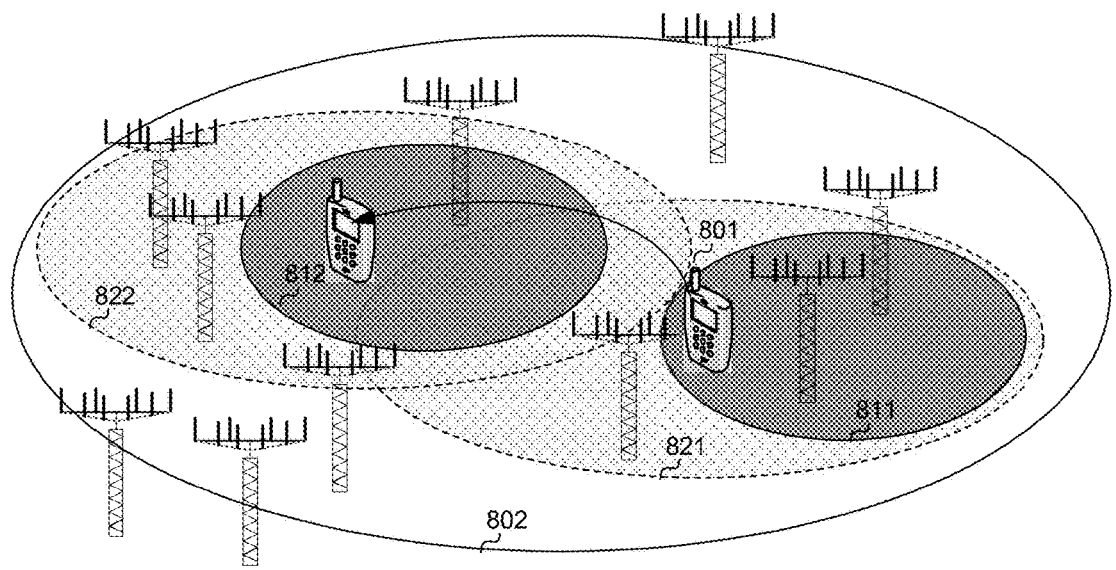
FIG. 8
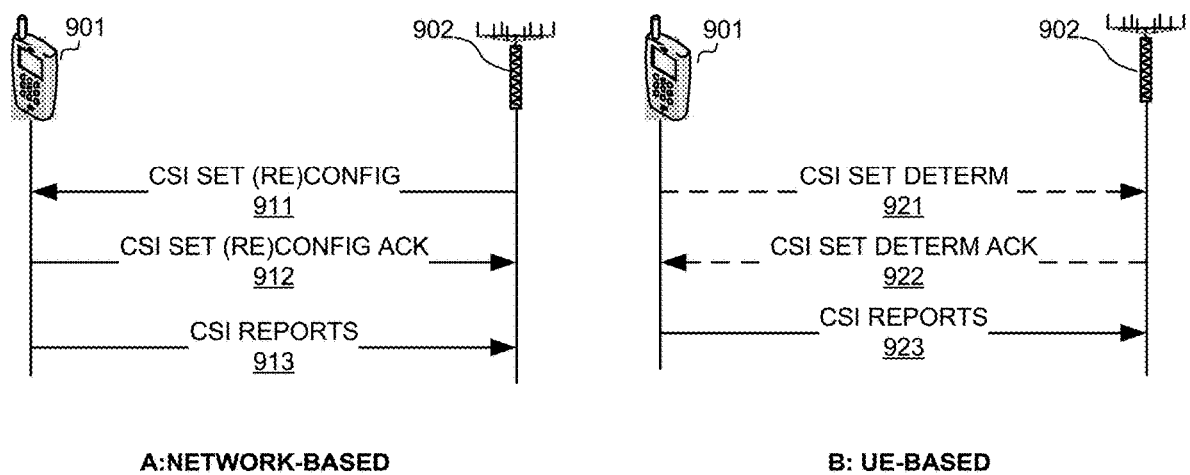
A: NETWORK-BASED
B: UE-BASED
FIG. 9A
FIG. 9B

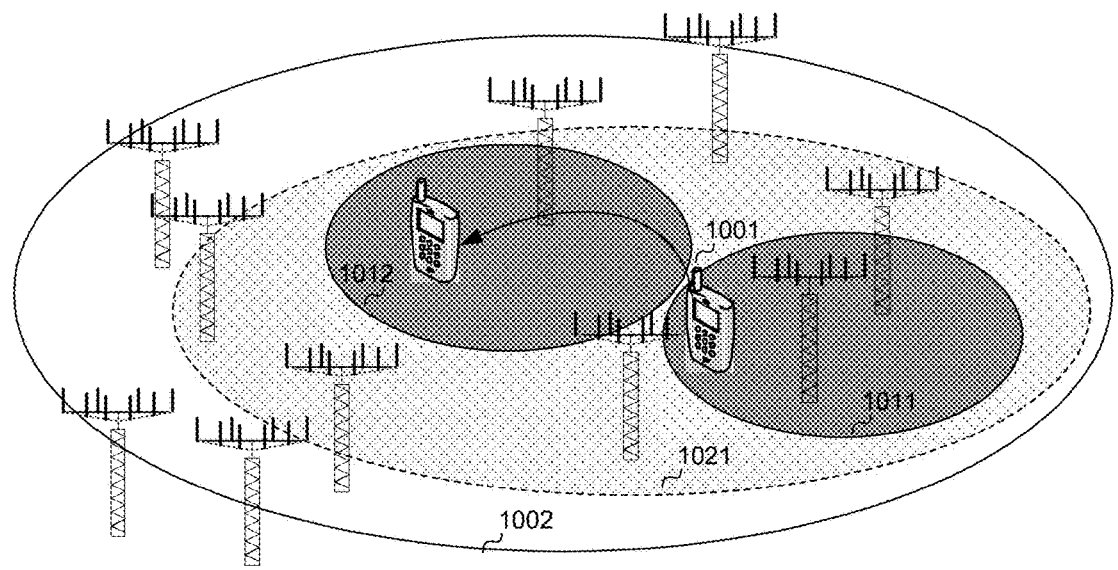
FIG. 10
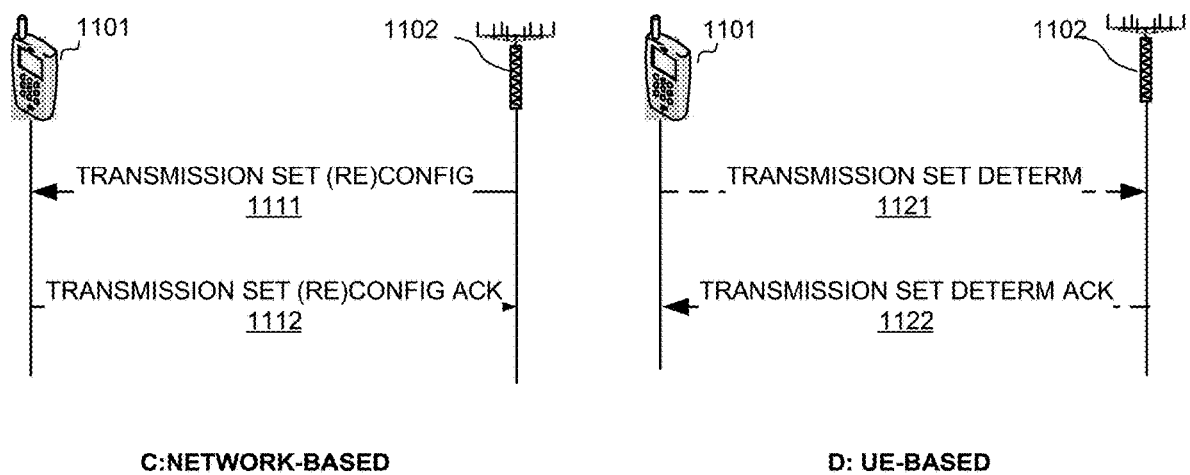
C:NETWORK-BASED
D: UE-BASED
FIG. 11A
FIG. 11B

METHODS AND APPARATUS TO SUPPORT MOBILITY THROUGH BEAM TRACKING IN NEW RADIO ACCESS SYSTEM

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2016/084687, with an international filing date of Jun. 3, 2016. This application is a continuation of International Application No. PCT/CN2016/084687. International Application No. PCT/CN2016/084687 is pending as of the filing date of this application, and the United States is a designated state in International Application No. PCT/CN2016/084687. The disclosure of each of the foregoing documents is incorporated herein by reference.

TECHNICAL FIELD

The disclosed embodiments relate generally to wireless communication, and, more particularly, to methods and apparatus to support mobility through beam tracking in the new radio access system.

BACKGROUND 5G radio access technology will be a key component of the modern access network. It will address high traffic growth and increasing demand for high-bandwidth connectivity. It will also support massive numbers of connected devices and meet the real-time, high-reliability communication needs of mission-critical applications. Both the stand-alone NR deployment and non-standalone NR with LTE/eLTE deployment will be considered. For example, the incredible growing demand for cellular data inspired the interest in high frequency (HF) communication system. One of the objectives is to support frequency ranges up to 100 GHz. The available spectrum of HF band is 200 times greater than conventional cellular system. The very small wavelengths of HF enable large number of miniaturized antennas to be placed in small area. The miniaturized antenna system can form very high very high gain, electrically steerable arrays and generate high directional transmissions through beamforming.

Beamforming is a key enabling technology to compensate the propagation loss through high antenna gain. The reliance on high directional transmissions and its vulnerability to the propagation environment will introduce particular challenges including intermittent connectivity and rapidly adaptable communication. HF communication will depend extensively on adaptive beamforming at a scale that far exceeds current cellular system. High reliance on directional transmission such as for synchronization and broadcast signals may delay the base station detection during cell search for initial connection setup and handover, since both the base station and the mobile stations need to scan over a range of angles before a base station can be detected. HF signals are extremely susceptible to shadowing due to the appearance of obstacles such as human body and outdoor materials. Therefore, signal outage due to shadowing is a larger bottleneck in delivering uniform capacity. Due to the small coverage of the cell, the relative path losses and cell association also change rapidly. All these pose new requirements for mobility management in the new radio (NR) access system/network.

SUMMARY

Methods and apparatus are provided for mobility support through beam tracking in the new radio access system. In one novel aspect, one or more beam-sets are configured for fast beam tracking. Each beam-set includes one or more beams, and each beam-set is corresponding to one or more transmit-receive points (TRPs). In one embodiment, each beam or TRP is distinguishable by beam/TRP reference signals (RSs). Each beam or TRP is identified by the beam-specific or TRP-specific identity. The UE performs the mobility support through lower layer based on one or more configured beam-sets. The lower layer can be a MAC layer or a PHY layer.

In one embodiment, a beam set called channel status information (CSI) set is configured. A beam set called transmission set is also configured based on the configured CSI set. Both the CSI set and the transmission set contain different types of beams, which have different resolutions and operate for different purposes. For example, the control beams are used to transmit control information and provide coverage, and the dedicated beams are used to transmit data. The UE performs CSI measurements on all beams of the CSI set for potential beam tracking. The UE performs data transmitting and receiving, and/or control signaling transmitting and receiving through one or more beams of the transmission set. The control signaling includes at least one of signals comprising a CSI report, a beam switching command as well as the acknowledgement for the beam switching command, a scheduling request (SR), a downlink (DL) assignment, and an uplink (UL) grant, preambles for random access. The TRPs for data transmitting and receiving change dynamically for different transmission time interval (TTI) within the transmission set. In one embodiment, the UE performs a mobility management via a lower layer based on the CSI set and the transmission set, wherein the lower layer is one of protocol layers comprising PHY layer and MAC layer.

The CSI set can be configured by a network entity based at least one of CSI-set information comprising: UE location information, and UE RRM measurement reports or both. The CSI set can also be configured by the UE based on UE RRM measurement results, UE location information or both. The transmission set can be configured by a network entity based on at least one of information comprising: UE location information, and UE CSI measurement reports or both. The transmission set can also be configured by the UE based on CSI measurement results.

In another embodiment, a beam set called candidate set for mobility support is defined. The candidate set is a superset of one or more CSI sets including multiple TRPs each with multiple beams, and wherein the candidate set is used for mobility procedures and a CSI set determination. The candidate set can be configured by the UE. The candidate set can also be configured by the network. The candidate configuration procedure either can be as part of the RRM measurement procedure or an additional procedure based on the RRM measurement results and reports.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 8 illustrates an exemplary diagram of the reconfiguration of the CSI set in accordance with embodiments of the current invention.

FIG. 9A illustrates an exemplary flow chart of the network-based reconfiguration of the CSI set in accordance with embodiments of the current invention.

FIG. 9B illustrates an exemplary flow chart of the UE-based reconfiguration of the CSI set in accordance with embodiments of the current invention.

FIG. 10 illustrates an exemplary diagram of the reconfiguration of the transmission set in accordance with embodiments of the current invention.

FIG. 11A illustrates an exemplary flow chart of the network-based reconfiguration of the transmission set in accordance with embodiments of the current invention.

FIG. 11B illustrates an exemplary flow chart of the UE-based reconfiguration of the transmission set in accordance with embodiments of the current invention.

DETAILED DESCRIPTION

Reference will now be made in detail to some embodiments of the invention, examples of which are illustrated in the accompanying drawings.

Figure 1:
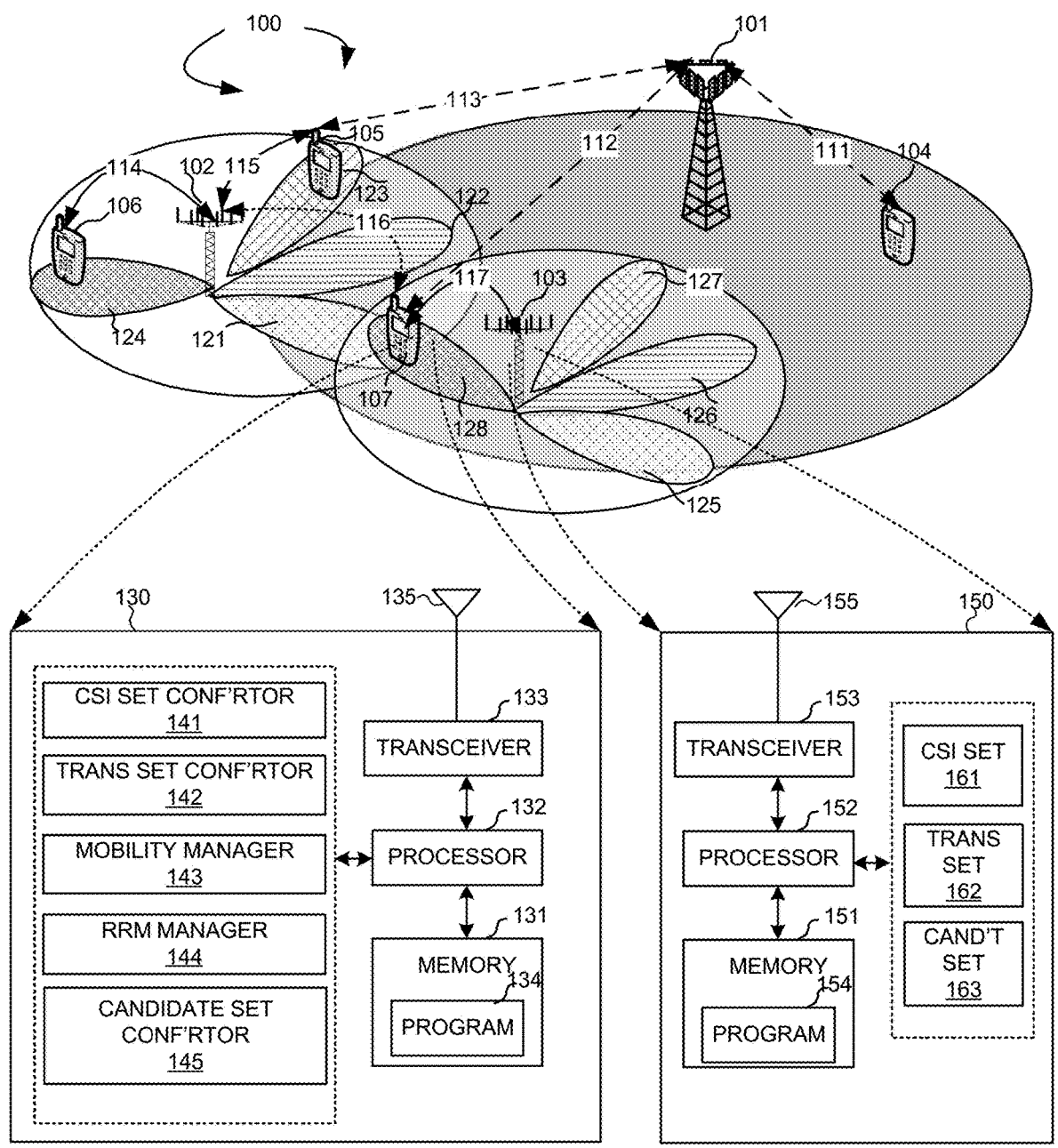
FIG. 1 is a schematic system diagram illustrating an exemplary new radio (NR) network in accordance with embodiments of the current invention.

FIG. 1 is a schematic system diagram illustrating an exemplary new radio (NR) network 100 in accordance with embodiments of the current invention. A NR network can use one or more different radio access technologies working on different spectrums, such as a high frequency (HF) network (>6 GHz), and a low frequency (LF) network (<6 GHz. Throughout the specification, some specific technology, such as HF, is used as exemplary descriptions. It is understood by one of ordinary skills in the art that these characteristics apply to other radio access technologies working on either HF or LF. Wireless system 100 includes one or more fixed base infrastructure units forming a network distributed over a geographical region. The base unit may also be referred to as an access point, an access terminal, a base station, a Node-B, an eNode-B, and is corresponding to one or more TRPs, or by other terminology used in the art. In a NR network, one or more TRPs are deployed to cover a geographical area, which are connected to a centralized unit. It allows transmission of baseband signal over long distance thus achieving large-scale centralized base station deployment. Each TRP transmits a set of beams with beam sweeping. In one embodiment, the beams are directional beams.

As an example, base stations 101, 102 and 103 serve a number of mobile stations 104, 105, 106 and 107 within a serving area, for example, a cell, or within a cell sector. In some systems, one or more base stations are coupled to a controller forming an access network that is coupled to one or more core networks. Base station 101 is a conventional base station served as a macro Base station. Base station 102 and base station 103 are NR base station, the serving area of which may overlap with serving area of base station 101, as well as may overlap with each other at the edge. If the serving area of NR base station does not overlap the serving area of macro Base station, the NR Base station is considered as standalone, which can also provide service to users without the assistance of macro base station. Base station 102 and base station 103 has multiple sectors each with multiple control beams to cover a directional area. Control beams 121, 122, 123 and 124 are exemplary control beams of base station 102. Control beams 125, 126, 127 and 128 are exemplary control beams of base station 103. As an example, UE or mobile station 104 is only in the service area of base station 101 and connected with base station 101 via a link 111. UE 106 is connected with NR network only, which is covered by control beam 124 of base station 102 and is connected with base station 102 via a link 114. UE 105 is in the overlapping service area of base station 101 and base station 102. In one embodiment, UE 105 is configured with dual connectivity and can be connected with base station 101 via a link 113 and base station 102 via a link 115 simultaneously. UE 107 is in the service areas of base station 101, base station 102, and base station 103. In one embodiment, UE 107 is configured with dual connectivity and can be connected with base station 101 with a link 112 and base station 103 with a link 117. In another embodiment, UE 107 can switch to a link 116 connecting to base station 102 upon connection failure with base station 103.

FIG. 1 further illustrates simplified block diagrams 130 and 150 for UE 107 and base station 103, respectively. Mobile station 107 has an antenna array 135, which contains multiple antenna elements for beamforming, transmits and receives radio signals. A RF transceiver module 133, coupled with the antenna array, receives RF signals from antenna array 135, converts them to baseband signal, and sends them to processor 132. RF transceiver module 133 is an example, and in one embodiment, the RF transceiver module comprises two or more RF modules (not shown), first RF module is used for NR transmitting and receiving, and another RF module is used for different frequency bands transmitting and receiving which is different from the NR transceiving. RF transceiver 133 also converts received baseband signals from processor 132, converts them to RF signals, and sends out to antenna 135. Processor 132 processes the received baseband signals and invokes different functional modules to perform features in mobile station 107. Memory 131 stores program instructions and data 134 to control the operations of mobile station 107.

Mobile station 107 also includes multiple function modules that carry out different tasks in accordance with embodiments of the current invention. A CSI set configurator 141 configures a CSI set comprising of one or more beams corresponding to one or more TRPs, wherein the UE performs CSI measurements on all beams of the CSI set for potential tracking. A transmission set configurator 143 configures a transmission set, wherein the transmission set is a subset of the CSI set comprising of one or more beams, and wherein the UE performs data transmitting and receiving, and control signaling transmitting and receiving through one or more beams of the transmission set. A mobility manager 144 performs a mobility management via a lower layer based on the CSI set and the transmission set, wherein the lower layer is one of protocol layers comprising PHY layer and MAC layer. A RRM manager 144 performs a radio resource management (RRM) measurement procedure on RRC layer. A candidate set configurator 145 configures a candidate set, wherein the candidate set is a super of one or more CSI sets including multiple beams corresponding to one or more TRPs, and wherein the candidate set is used for mobility procedures when UE moves from one larger area to another, such as "cell-level" mobility. It is also used for a CSI set determination.

In another embodiment, only a beam set configurator 141 is used to configuring the configuration of a CSI set, a transmission set and a candidate set. The CSI set comprising of one or more beams corresponding to one or more TRPs, wherein the UE performs CSI measurements on all beams of the CSI set for potential tracking. The transmission set is a subset of the CSI set, wherein the UE performs data transmitting and receiving, and control signaling transmitting and receiving through one or more beams of the transmission set. The candidate set, which is a super of one or more CSI sets including multiple beams corresponding to one or more TRPs. It is used for mobility procedures when UE moves from one cell to another and a CSI set determination. Or the beam set configurator 141 is implemented as a manager, which receives the beam setting from the information received from base stations. The beam setting could be stored in the memory 131.

Similarly, base station 103 has an antenna array 155, which contains multiple antenna elements for beamforming, transmits, and receives radio signals. A RF transceiver module 153, coupled with the antenna array, receives RF signals from antenna array 155, converts them to baseband signals, and sends them to processor 152. RF transceiver 153 also converts received baseband signals from processor 152, converts them to RF signals, and sends out to antenna array 155. Processor 152 processes the received baseband signals and invokes different functional modules to perform features in base station 103. Memory 151 stores program instructions and data 154 to control the operations of base station 103. Base station 103 also includes multiple function modules that carry out different tasks in accordance with embodiments of the current invention. A CSI set configurator 161 configures and handles the CSI set. A transmission set configurator 162 configures and handles the transmission set. A candidate set configurator 163 configures and handles the candidate set.

In another embodiment, the CSI set, the transmission set and the candidate set are determined by the UE, so there is only one control unit called beam-set handler 161 in base station 103, which is used to configuring and managing the CSI set, the transmission set and the candidate set.

In one novel aspect, one or more beam-sets are configured for fast beam tracking. Each beam-set includes one or more beams, and each beam-set are corresponding to one or more TRPs. In one embodiment, each beam or TRP is distinguishable by beam/TRP reference signals (RSs). Each beam or TRP is identified by the beam-specific or TRP-specific identity. The UE performs the mobility support based on one or more configured beam-sets. In one embodiment, a beam set called channel status information (CSI) set is configured. A beam set called transmission set is also configured based on the configured CSI set. Both the CSI set and the transmission set contain different types of beams, which have different resolutions and transmit for different purposes. For example, the control beams are used to transmit control signals and the dedicated beams are used to transmit data. The UE performs CSI measurements on all beams of the CSI set for potential beam tracking. The UE performs data transmitting and receiving, and/or control signaling transmitting and receiving through one or more beams of the transmission set. The control signaling includes at least one of signals comprising a CSI report, a beam switching command as well as the acknowledgement for the beam switching command, a scheduling request (SR), a downlink (DL) assignment, and an uplink (UL) grant, preambles for random access. The beams and TRPs for data transmitting and receiving change dynamically for different transmission time interval (TTI) within the transmission set. In one embodiment, the UE performs a mobility management via a lower layer based on the CSI set and the transmission set, wherein the lower layer is one of protocol layers comprising PHY layer and MAC layer.

The CSI set can be configured by a network entity based at least one of CSI-set information comprising: UE location information, and UE RRM measurement reports or both. The CSI set can also be configured by the UE based on UE RRM measurement results, UE location information or both. The transmission set can be configured by a network entity based at least one of information comprising: UE location information, and UE CSI measurement reports or both. The transmission set can also be configured by the UE based on CSI measurement results.

In another embodiment, a beam set called candidate set for mobility support is defined. The candidate set is a superset of one or more CSI sets including multiple beams corresponding to multiple TRPs, and wherein the candidate set is used for mobility procedures when UE moves from one larger area to another and a CSI set determination. The candidate set can be configured by the UE. The candidate set can also be configured by the network. The candidate configuration procedure either can be as part of the RRM measurement procedure or an additional procedure based on the RRM measurement results and reports.

Please note that, the term "configure" in this invention means to derive the parameters, store those parameters as variables in the memory, arrange the function units and give the initial setting for those functions according to the parameters. For example, there are two approaches for the UE to configure the transmission set. In the first approach, UE determines the configuration of transmission beam set based on local information, such as the location information or the local RRM measurement results, which are measured and derived by UE and are stored locally in UE's memory. In the second approach, UE determines the configuration of transmission beam set based on the configuration information received from the network. The parameters in the configuration are determined by the network based on UE's reports. The same meaning of "configure" applies to configure the CSI set and the candidate set for the person skilled in the art, for similarity, not to describe the details.

Figure 2:
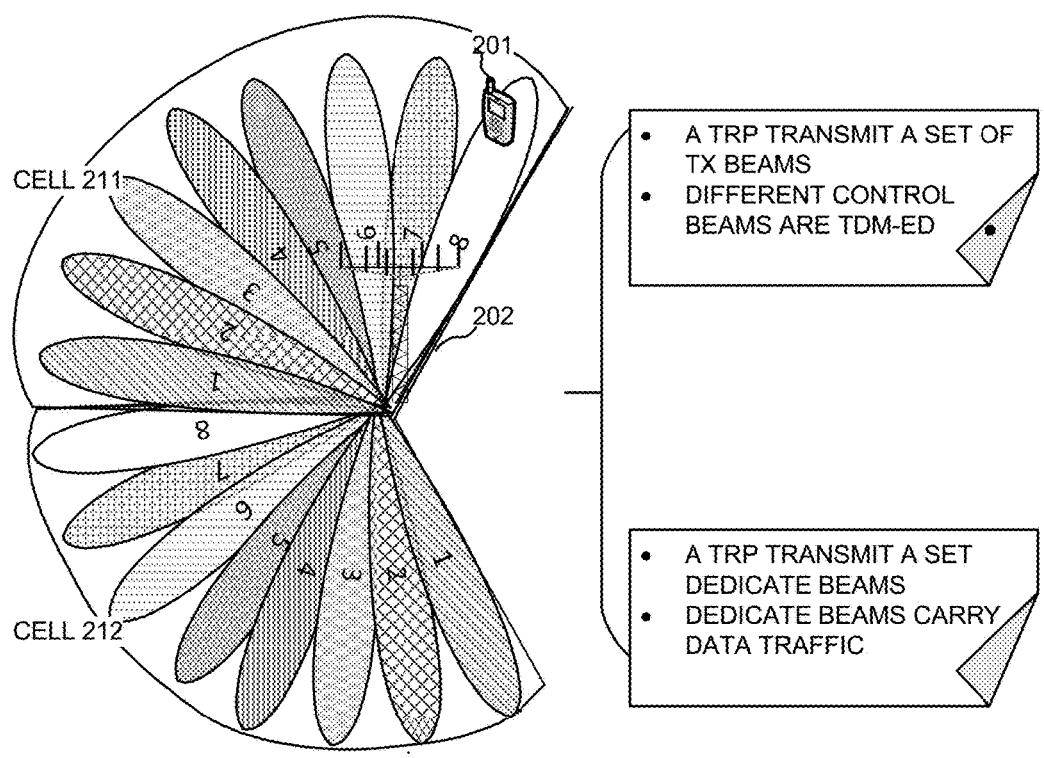
FIG. 2 illustrates an exemplary NR wireless system with multiple control beams and dedicated beams in multiple directionally configured cells in accordance with embodiments of the current invention.

FIG. 2 illustrates an exemplary NR wireless system with multiple control beams and dedicated beams in multiple directionally configured cells in accordance with embodiments of the current invention. A UE 201 is connected with an base station 202. Base station 202 provides coverage with multiple sectors/cells. Each sector/cell is covered by a set of coarse TX control beams through beam sweeping. As an example, cell 211 and cell 212 are configured as cells for base station 202. In one example, three sectors/cells are configured, each covering a 120° sector. In one embodiment, each cell is covered by eight control beams. Different control beams are time division multiplexed (TDM) and distinguishable. Beamforming array antenna is used to provide a moderate beamforming gain. The set of control beams is transmitted repeatedly and periodically. Each control beam broadcasts the cell-specific information such as synchronization signal, system information, and beam-specific information. Besides coarse TX control beams, there are multiple dedicated data beams, which are finer-resolution beams. And each control beam has a wider beam-width and shorter spatial coverage. Each control beam in turn is associated to a set of dedicated data beams. For example, one control beam is associated to a set of four dedicated data beams. The collection of the dedicated data beams covers a service area of one control beam, and each dedicated data beam has a narrower beam-width with higher antenna gain and longer spatial coverage.

Beam tracking is an important function for the NR mobile stations. Multiple beams, including coarse control beams and dedicated data beams are configured for each of the directionally configured cells. The UE monitors the qualities of its neighboring beams by beam tracking. Each NB eNB, or a TRP transmits a set of TX control beams. The set of control beams are TMD-ed. The TRP also transmits a set of dedicated data beams. The dedicated data beams carry the data traffic.

Figure 3:
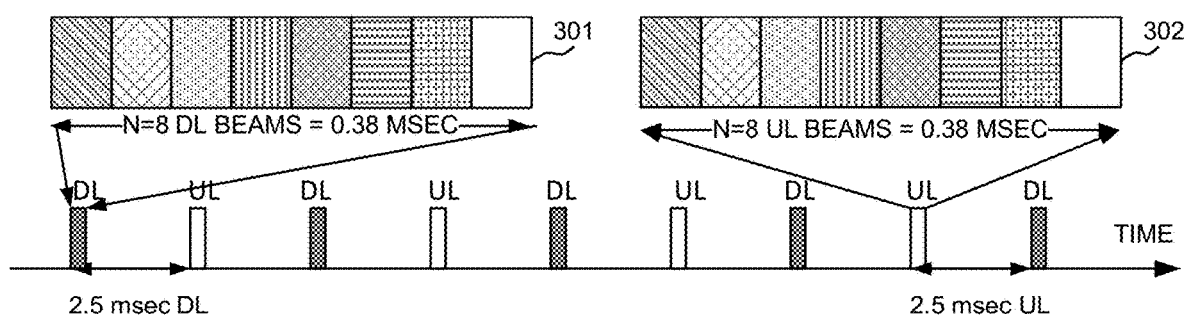
FIG. 3 illustrates an exemplary control beam configuration for UL and DL of the UE in accordance with the current invention.

FIG. 3 illustrates an exemplary control beam configuration for UL and DL of the UE in accordance with the current invention. A control beam is a combination of downlink and uplink resources. The linking between the beam of the DL resource and the beam of the UL resources is indicated explicitly in the system information or beam-specific information. It can also be derived implicitly based on some rules, such as the interval between DL and UL transmission opportunities. In one embodiment, A DL frame 301 has eight DL beams occupying a total of 0.38 msec. A UL frame 302 has eight UL beams occupying a total of 0.38 msec. The interval between the UL frame and the DL frame is 2.5 msec.

Figure 4:
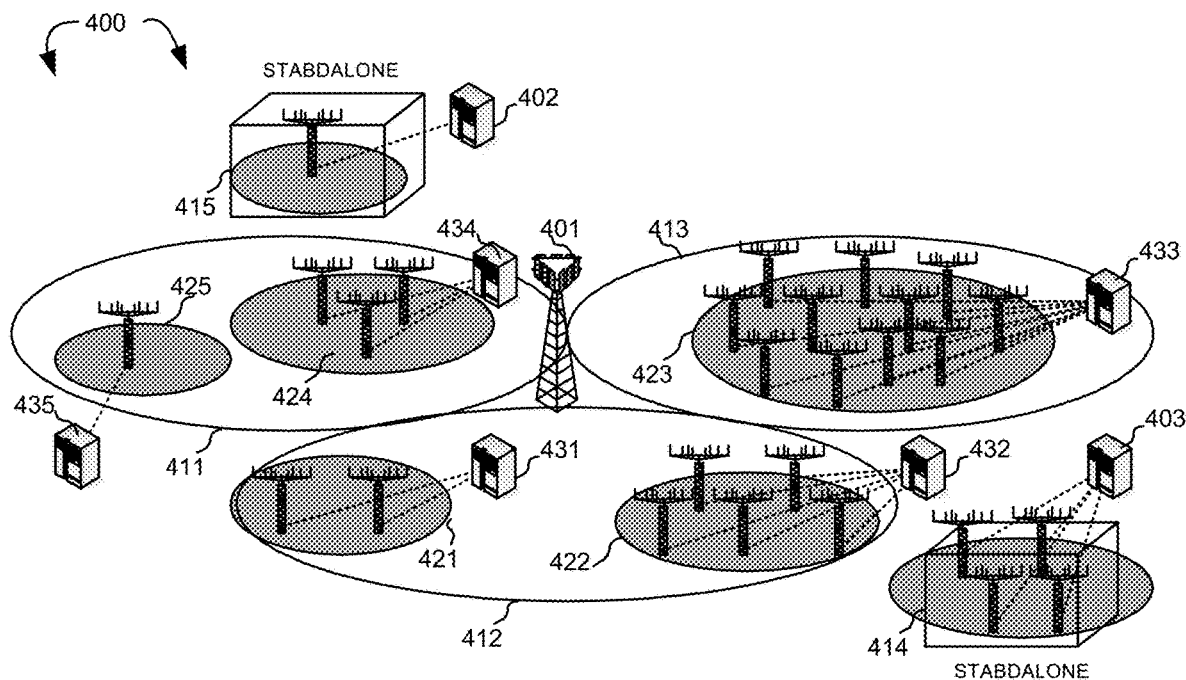
FIG. 4 illustrates an exemplary diagram of a deployment scenario where a cell is covered by multiple TRPs in accordance with embodiments of the current invention.

FIG. 4 illustrates an exemplary diagram of a deployment scenario where a geographic area is covered by multiple TRPs in accordance with embodiments of the current invention. This group of TRPs connects to a centralized unit, which allows transmission of baseband signal over long distance thus achieving large-scale centralized base station deployment. The coverage of the centralized unit controlling one or multiple distribute units or TRPs as is identified and considered as one "cell". In other words, the coverage of a group of TRPs with control of a centralized unit is considered as a cell. To the person skilled in the art, the cell is associated with the group of TRPs, and is not the traditional cellular unit in the cellular system, and it is a virtualized concept. This virtualized cell is used for UE to acquire necessary system information to access the network, used for UE to evaluate the quality of different geographic area to determine where to access the network, used by the network to evaluate the quality of different geographic area to determine where to provide UE services. In the following description, in one case, cell is considered as the virtual cell associated with a group of TRPs; in another case, for the system with the cellular cells, the cell in the description could mean the actual cell.

A macro ce BS 401 covers area 411, 412, and 413. In one embodiment, a cell is covered by a group of TRPs, which including one or more TRPs. Some of the TRP-formed cells overlaps with macro cells and can internetworking with the macro cell network. Each TRP-formed cells has one or more control nodes or centralized unit, such as a 5G node, which connects each TRP in the cell through ideal/nonideal backhaul/fronthaul connection. The control node is a centralized unit, which performs dynamic scheduling for each TRP in the cell through the lower layer, such as the PHY or the MAC layer. The latency over the backhaul or front-haul is small enough. In such deployment, the cell size is scalable. For example, it can have a small cell size, such as cell 421, which has two TRPs connecting to a 5G node 431 and forming the cell. Cell 425 has only one TRP connecting with a 5G node 435, so this deployment is called single TRP deployment, wherein, the cell is covered by a single TRP, and the cell is fixed and small, this TRP could be connected to CN through ideal backhaul or non-ideal backhaul. The cell size can be larger with more TRPs, which could be called multiple TRP deployment, such as cell 422 with five TRPs connecting to a 5G node 432, and a cell 424 with three TRPs connecting to a 5G node 434. The cell size can be large with large number of the TRPs, such as cell 423 with hundreds of TRPs connecting to a 5G node 433, forms a large cell size. Such deployment can also form standalone cells without internetworking with other macro cells. The standalone cell can be with one TRP to form a cell, such as a cell 415, which has one TRP connecting to a 5G node 402. Similarly, multiple TRPs can form a standalone cell, such as cell 414, which has four TRPs connecting to a 5G node 403.

Figure 5:
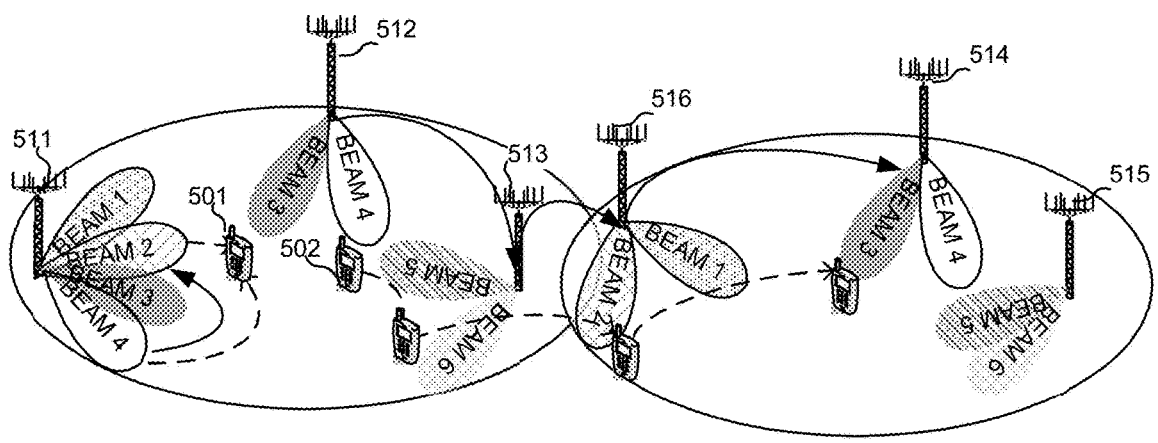
FIG. 5 illustrates an exemplary diagram of supporting mobility through beam tracking in a NR network in accordance with embodiments of the current invention.

FIG. 5 illustrates an exemplary diagram of supporting mobility through beam tracking in a NR network in accordance with embodiments of the current invention. There are multiple TRPs in FIG. 5, which are TRP 511-515, and each of the TRP 511-515 has multiple control beams and multiple dedicated data beams. In one embodiment, beam tracking is used to support mobility in the NR network. For a single TRP deployment, beam tracking is within one cell. And beam tracking within one cell is more like link adaptation. For multiple-TRP deployment, inter-TRP beam tracking is required when UE moves from one TRP coverage area to a coverage area of another TRP. There are three different types of beam tracking, as illustrated in FIG. 5, including the intra-cell and intra-TRP beam tracking, intra-cell and inter-TRP beam tracking and the inter-cell and inter-TRP beam tracking. A UE 501 is under the coverage area of a TRP 511. As UE 501 moves, it switches from beam-4 of TRP 511 to beam-2 of TRP 511. The mobility for UE 501 is intra-cell and intra-TRP mobility. A UE 502 moves from beam-3 of TRP 512 to beam-5 of TRP 513. The mobility for UE 502 when switching to beam-5 of TRP 513 is an intra-cell and inter-TRP mobility, because TRP 512 and 513 are both in the same cell. As UE 502 continues to move, it moves from beam-5 of TRP 513 to beam-2 of TRP 516. Since TRP 513 and TRP 516 are not in the same cell, it is an inter-cell and inter-TRP mobility. In one novel aspect, the invention provides the mechanisms, procedures and signaling to enable fast beam tracking to support UE mobility in the NR network.

In one novel aspect, different beam sets are configured, for example, transmission set, CSI set and candidate set. Each beam set consists of one or more beams corresponding to TRPs. Each beam or TRP is distinguished by beam or TRP-specific reference signals (RSs). Each beam and TRP is identified by the beam ID or TRP-specific ID, respectively. And there are association between beam and TRP.

Figure 6:
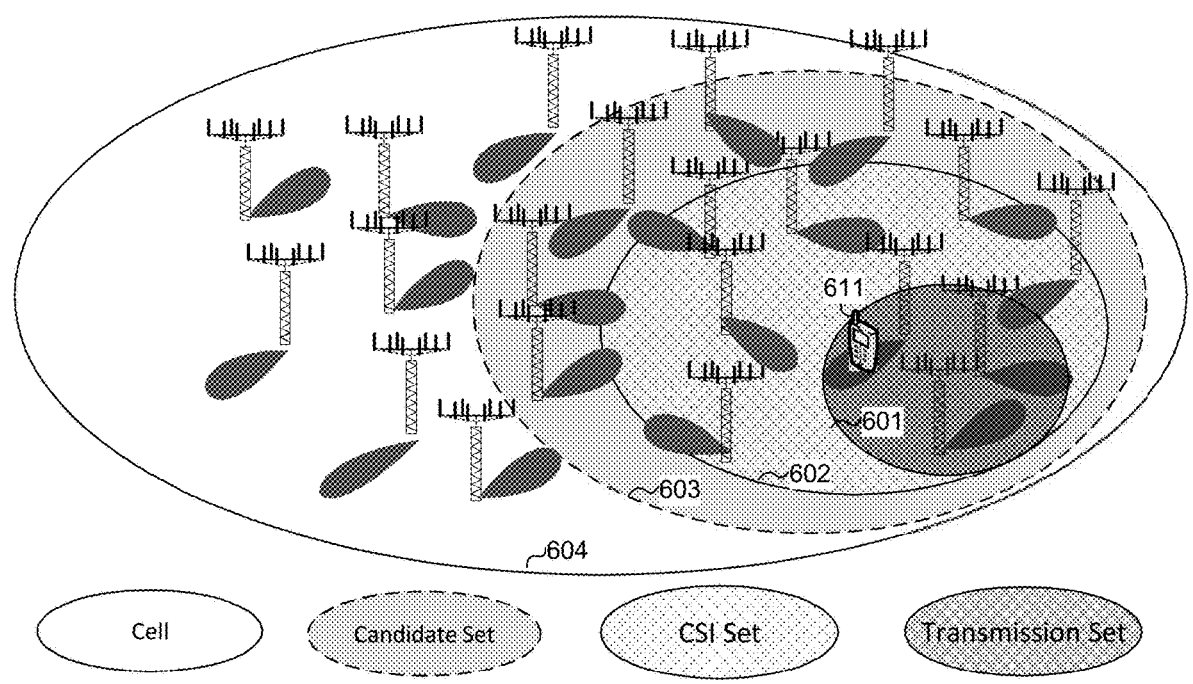
FIG. 6 illustrates an exemplary diagram for different beam sets configuration in accordance with embodiments of the current invention.

FIG. 6 illustrates an exemplary diagram for different beam sets configuration in accordance with embodiments of the current invention. A UE 611 connects with a NR network. A transmission set 601, which is the closest vicinity of UE 611, is configured. Transmission set 601 includes one or more beams corresponding to one or more TRPs. A channel status information (CSI) set 602 is configured. Transmission set 601 is a subset of CSI set 602, or equal to the CSI set 602. Optionally, a candidate set 603 can be configured. CSI set 602 is a subset of candidate set 603. Multiple TRPs forms a cell 604. With different beam sets, the mobility performance in the NR network is improved.

In one embodiment, the CSI set is used for potential beam tracking or switching. The CSI means the Instantaneous CSI (or short-term CSI). The current channel conditions are known, which can be viewed as knowing the impulse response of a digital filter. This gives an opportunity to adapt the transmitted signal to the impulse response and thereby optimize the received signal for spatial multiplexing or to achieve low bit error rates. In NR with beamforming operation, especially in the HF system, CSI set is used for fast beam tracking. CSI measurement is performed by physical layer. UE performs CSI measurement, as well as optionally performs CSI report. UE optionally transmits UL reference signals for network to perform CSI measurement. The CSI set can be configured by the network, or determined by the UE or is generated through negotiation by both the network and the UE. Optional, the CSI set could be determined by UE from a pool configured by network. And the update of CSI set i.e. CSI set configuration (reconfiguration) could be done on RRC layer or MAC layer.

The transmission set is used for data transmission and reception. It is also use for control signaling transmission and reception. The control signaling includes CSI report, beam-switching command as well as the acknowledgement for the command, scheduling request (SR), downlink (DL) assignment, or uplink (UL) grant. The TRP(s) used for data transmission/reception within the transmission set can be dynamically changed per TTI. And the configuration of transmission set is determined by the network or the UE, or negotiated by both the network and UE.

Optionally, a candidate set is used for CSI set determination, and its functions comprise CSI set determination, handover and/or cell selection or re-selection. It used to optimize the beam ID detection complexity if the beam ID space is large. Once configured, the UE performs RRM measurement on the candidate set. RRM measurement is used to acquire the Statistical CSI or long-term CSI. It means that a statistical characterization of the channel is known. This description can include, for example, the type of fading distribution, the average channel gain, the line-of-sight component, and the spatial correlation. The long term CSI can be pathloss, RSSI, RSRP, or RSRQ, etc, which is an average/leverage measurement over the measurement samplings over PHY layer. The average or flitering is performed on RRC layer, where the RRM measurement results are derived. Optionally the UE performs RRM report on the candidate set as well. Optionally the UE transmits UL reference signals on the candidate set for network to perform RRM measurement. The system information and paging messages can be transmitted through the beams configured in the candidate set. The candidate set can be configured by the network, or determined by the UE, or negotiated by both the network and the UE. And update of candidate set, i.e. configuration (reconfiguration) is done by the UE or the network.

Figure 7:
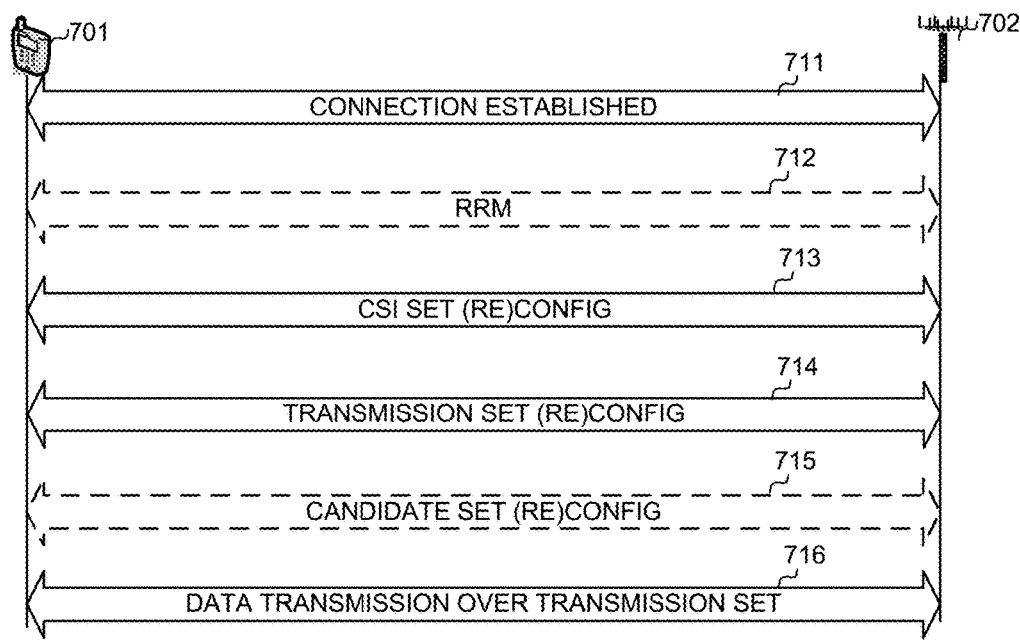
FIG. 7 illustrates an exemplary flow chart of a basic call flow with multiple beam sets configured in accordance with embodiments of the current invention.

FIG. 7 illustrates an exemplary flow chart of a basic call flow with multiple beam sets configuration in accordance with embodiments of the current invention. A UE 701 connects with a TRP 702 in a NR network. At step 711, UE 701 establishes connection or connectivity with TRP 702. Optionally, at step 712, UE 701 performs RRM measurement. In one embodiment, UE 701 performs RRM measurement and uses the measurement results locally. In another embodiment, the UE performs RRM measurement, generates RRM measurement reports, and sends the measurement report to the network. In one embodiment, the CSI set is determined by the UE. In another embodiment, the CSI set is determined by the network. At step 713, UE 701 configures or reconfigures the CSI set if the CSI set is determined by UE according to the local RRM measurement results. In another embodiment, if UE 701 sends the RRM measurement report after step 712, the network could determine the CSI set, and it sends the CSI set configuration to the UE 701 through TRP 702, so UE 701 could updates the CSI set configuration in step 713. In one embodiment, the transmission set is determined by the UE. In another embodiment, the transmission set is configured by the network. At step 704, UE 701 configures or reconfigures the transmission set if the transmission set is determined by the UE according to the local CSI measurement results. In another embodiment, if UE 701 sends the CSI reports after step 712, the network could determined the transmission set, and sends the transmission set configuration to the UE 701 through TRP 702, so UE 701 could updates the transmission set in step 714. In one embodiment, the candidate set is determined by the UE. In another embodiment, the candidate set is configured by the network. Optionally, at step 715, UE 701 configures or reconfigures the candidate set if the candidate set is determined by the UE according to the local RRM measurement results or location information. If the candidate set is determined by the network, it could sends the configuration of candidate set to UE 701 through TRP 702, so UE could update the candidate set in step 715. At step 706, UE 701 performs data transmission over the TRPs in the transmission set.

FIG. 8 illustrates an exemplary diagram of the reconfiguration of the CSI set in accordance with embodiments of the current invention. A UE 801 connects with a NR network, that is to say, UE establishes connection/connectivity with the network. A transmission set 811 and a CSI set 821 are configured for UE 801 by UE 801 or network. The CSI set is configured by UE 801 or network when UE 801 establishing connection with the NR network. When UE 801 moves, the CSI set may need to be updated and reconfigured. As shown, as UE 802 moves, the CSI set for UE 801 is reconfigured to have the transmission set 812 and CSI set 822 by UE 801 or network. In one embodiment, one common procedure is used for both the CSI set configuration and the CSI set reconfiguration. The procedure can be performed at the radio resource control (RRC) layer or the MAC layer. Signals are delivered through RRC messages or MAC CEs.

FIG. 9A illustrates an exemplary flow chart of the network-based reconfiguration of the CSI set in accordance with embodiments of the current invention. A UE 901 is connected with a TRP 902 in the NR network. At step 911, the network sends a CSI set configuration or reconfiguration message to UE 901. At step 912, UE 901 sends the response for acknowledgement. At step 913, UE 901 sends CSI reports to the network, or sends UL reference signals for network to perform CSI measurement. In this embodiment, the UE performs CSI measurement or sends UL reference signals to the network on all the beams/TRPs of the CSI set. The UE performs CSI reports on all the beams/TRPs of the CSI set as well. The network may configure the CSI set base on the location information. In one embodiment, the neighboring TRP list is used to obtain location information. The network may configure the CSI set based on RRM measurement reports or the RRM measurement results through the measurement over the UL reference signals. The UE performs RRM measurement and sends the RRM measurement reports to the network or sends UL reference signals for network to perform RRM measurement. In one embodiment, if the candidate set is configured for the UE, the UE performs RRM measurement on the candidate set.

FIG. 9B illustrates an exemplary flow chart of the UE-based reconfiguration of the CSI set in accordance with embodiments of the current invention. A UE 901 is connected in the NR network with a TRP 902. At step 921, UE 901 determines the CSI set. Optionally, UE 901 sends CSI set determination message to the network. At step 922, the network sends CSI set determination ACK message for the CSI set determination. The UE performs CSI measurement on all the beams/TRPs of the CSI set. Optionally, at step 923, UE 901 sends CSI reports to the network or sends UL reference signals for network to perform CSI measurement. In one embodiment, the UE determines the CSI set based on the local RRM measurement result or the location information or both.

After the CSI set is configured, the transmission set needs to be configured based on the CSI set. When the UE moves, the transmission set needs to be updated or reconfigured. In one embodiment, one common procedure is used for both the configuration and reconfiguration of the transmission set. The procedure can be performed on the lower layer such as the MAC layer or the PHY layer. The signaling messages are delivered through MAC CEs or the physical control information over physical channels.

FIG. 10 illustrates an exemplary diagram of the reconfiguration of the transmission set in accordance with embodiments of the current invention. A UE 1001 connects to a NR network in a cell 1002. A transmission set 1011 and a CSI set 1021 are configured for UE 1001 by UE1001 or by network. UE 1001 subsequently moves. As UE 1001 moves, the transmission set for UE 1001 is reconfigured to be set 1012 by UE1001 or by network, which is in the same CSI set 1021. There is no reconfiguration for the CSI set for this move in this embodiment. Actually, the update procedure for CSI set and, transmission set could be common at the same time or different time, and the update are performed on MAC layer or PHY layer, which means the signaling for update are delivered through MAC CEs or physical control information over physical channels.

FIG. 11A illustrates an exemplary flow chart of the network-based reconfiguration of the transmission set in accordance with embodiments of the current invention. In this embodiment, the network configures the transmission set based on the CSI reports received from UE or the local CSI measurement results over the UL reference signals transmitted by UE. The transmission set can be updated dynamically by the network. And after each update, the old N beams/TRPs are replaced by the new N beams/TRPs with best N CSI report or CSI measurement results. Refer to FIG. 11A, a UE 1101 connects with a TRP 1102 in a NR network. At step 1111, the NR network configures the transmission set and sends the transmission set configuration or reconfiguration signaling to UE 1101. At step 1112, UE 1101 sends the transmission set configuration/reconfiguration ACK message to the NR network. In one embodiment, the configuration/reconfiguration signaling is delivered to UE 1101 through the PHY control information and carried on the physical control channel, such the PDCCH. In one embodiment, if UE 1101, upon receiving the configuration/reconfiguration signaling through the PHY control information and carried on the physical control channel, e.g. PDCCH, does not send the ACK message. In one embodiment, the network configures the transmission set based on the CSI reports received from the UE or the local CSI measurement results over the UL reference signals transmitted by UE. The transmission set can be changed dynamically by the network. The old one or more beams/TRPs are replaced by the new one or more beams/TRPs with best one or more CSI reports. In one embodiment, the UE performs data transmission/reception on one or more or all the beams/TRPs of the transmission set.

FIG. 11B illustrates an exemplary flow chart of the UE-based reconfiguration of the transmission set in accordance with embodiments of the current invention. In this embodiment, the UE configures the transmission set based on the local CSI measurement results, and the transmission set can be updated dynamically by UE. And after each update, the old N beams/TRPs are replaced by the new N beams/TRPs with best N CSI report. Please refer to FIG. 11B, a UE 1101 connects with a TRP 1102 in a NR network. At step 1121, UE 1101 determines the transmission set and sends the transmission set determination signaling to the network. At step 1122, the network sends the transmission set determination ACK message to UE 1101. In one embodiment, If the transmission set determination signaling is delivered to the network through the PHY control information and carried on the physical control channel, such the PUCCH. In one embodiment, the network, upon receiving the transmission set determination signaling through the PHY control information and carried on the physical control channel, does not send the ACK message. In one embodiment, UE 1101 configures the transmission set based on the local CSI measurement results. The old one or more beams/TRPs are replaced by the new one or more beams/TRPs with best CSI measurement results.

When the UE establishes the connection with the network, the candidate set can be configured optionally. When the UE moves, the candidate set needs to be updated and reconfigured. In one embodiment, one common procedure is used for both the configuration and reconfiguration of the candidate set. The procedure can be performed on the RRC layer. The signaling messages are delivered through the RRC messages.

Figure 12:
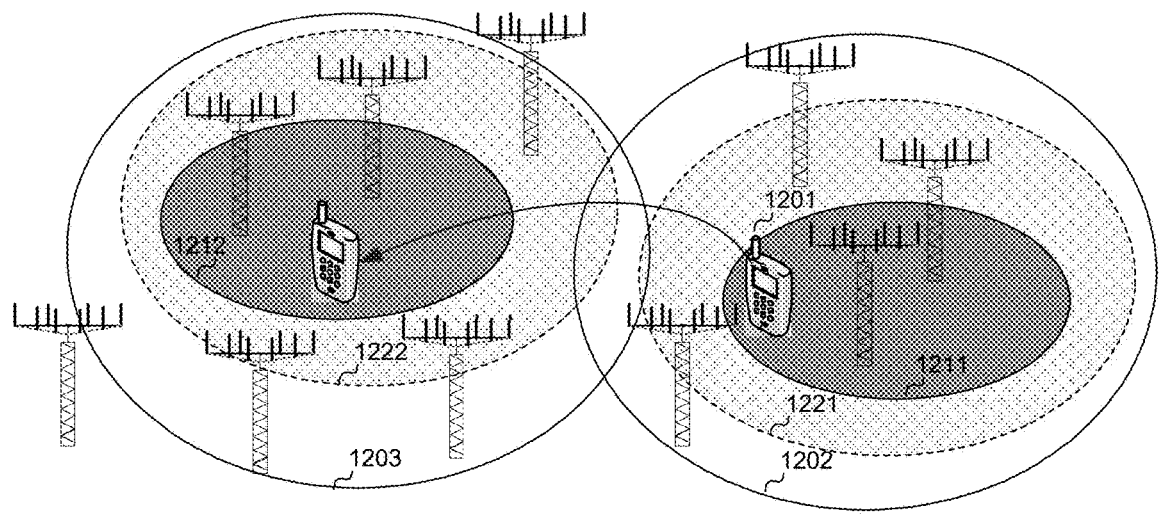
FIG. 12 illustrates an exemplary diagram of the reconfiguration of the candidate set in accordance with embodiments of the current invention.

FIG. 12 illustrates an exemplary diagram of the configuration/reconfiguration of the candidate set in accordance with embodiments of the current invention. A UE 1201 connects to a NR network. UE 1201 is configured with a transmission set 1211, a CSI set 1221, and a candidate set 1202 by the UE or the network. UE 1201 subsequently moves. As UE 1201 moves, the transmission set for UE 1201 is reconfigured to be 1212 by the UE or the network, which is a subset of the CSI set 1222. The candidate set is also reconfigured to be 1203 by UE or network. The update procedure could be performed on RRC layer, and the signaling are delivered through RRC messages.

Figures 13A, 13B:
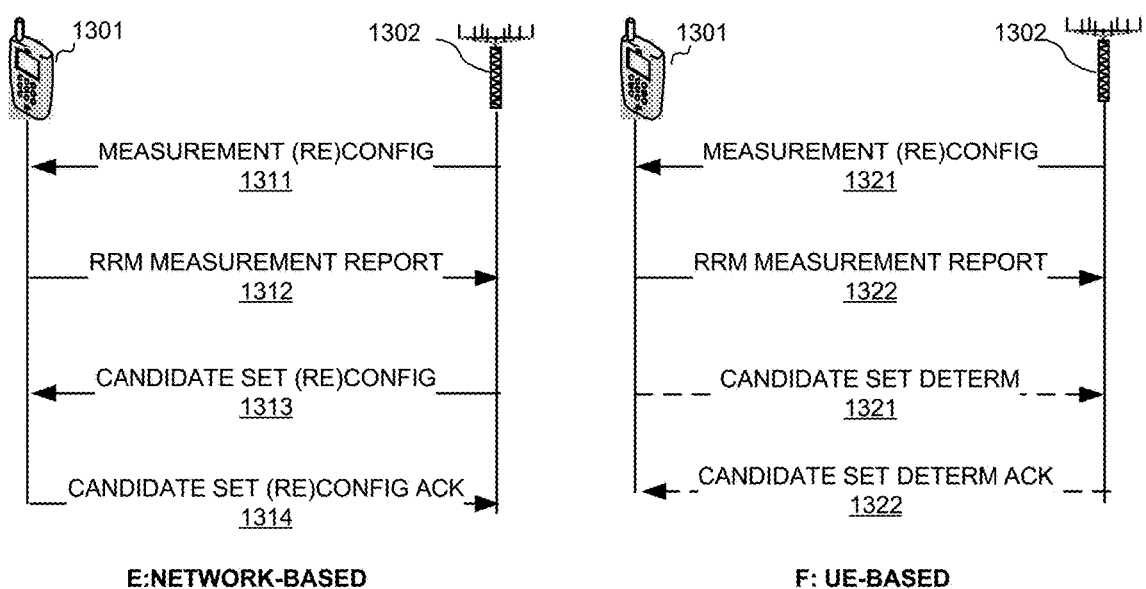
FIG. 13A illustrates an exemplary flow chart of the network-based reconfiguration of the candidate set in accordance with embodiments of the current invention.
FIG. 13B illustrates an exemplary flow chart of the UE-based reconfiguration of the candidate set in accordance with embodiments of the current invention.

FIG. 13A illustrates an exemplary flow chart of the network-based reconfiguration of the candidate set in accordance with embodiments of the current invention. A UE 1301 connects with a TRP 1302 in a NR network. At step 1311, the network configures the measurement relevant parameters and sends the measurement configuration message to UE 1301. At step 1312, UE 1301 performs RRM measurement and sends RRM measurement reports to the network or UE 1301 transmits UL reference signals for network to perform RRM measurement. At step 1313, the network configures the candidate set and sends the candidate set configuration/reconfiguration message the UE 1301. At step 1314, UE 1301 sends the candidate set configuration/reconfiguration ACK message to the network. In one embodiment, the network configures the candidate set based on the RRM measurement results or the location information. In this embodiment, the candidate set configuration/reconfiguration is one separate procedure from the RRM measurement configuration. In yet another embodiment, the network-based candidate set configuration/reconfiguration is included in the RRM measurement configuration procedure. The candidate set configuration/reconfiguration is part of the RRM measurement configuration. As an example, the network configures the candidate set and sends the candidate set configuration/reconfiguration message to the UE, which is a part of RRM measurement configuration. The UE sends ACK message back to the network. Subsequently, the UE performs RRM measurement reports for the candidate set or transmits UL reference signals for network to perform RRM measurement.

FIG. 13B illustrates an exemplary flow chart of the UE-based reconfiguration of the candidate set in accordance with embodiments of the current invention. A UE 1301 connects with a TRP 1302 in a NR network. Optionally, at step 1321, the network configures the measurement relevant parameters and sends the measurement configuration message to UE 1301. At step 1322, UE 1301 performs RRM measurement and sends RRM measurement reports to the network. At step 1323, UE 1301 determines the candidate set and sends the candidate set determination message to the network. At step 1324, the network sends candidate set determination ACK message to UE 1301. In one embodiment, the UE determines the candidate set based on the local RRM measurement results or the location information. In this embodiment, the candidate set configuration/reconfiguration is one separate procedure from the RRM measurement configuration.

Figure 14:
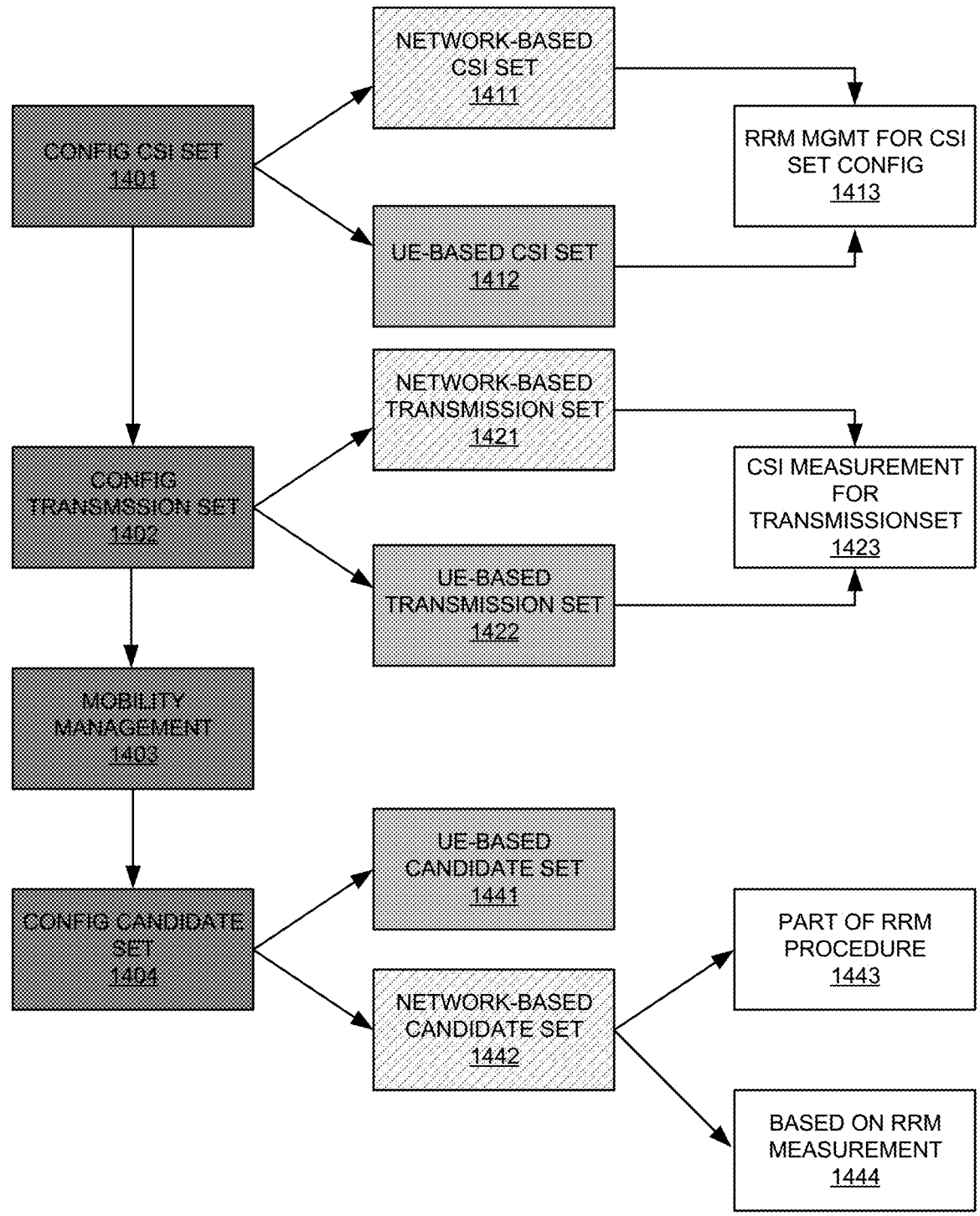
FIG. 14 illustrates an exemplary diagram of different combination of the overall beam-set configuration procedure in accordance with embodiments of the current invention.

FIG. 14 illustrates an exemplary diagram of different combination of the overall beam-set configuration procedure in accordance with embodiments of the current invention. In one novel aspect, the UE configures different beam-set for mobility management in the NR network. In another novel aspect, the network configures different beam-set for mobility management in the NR network. In one embodiment, in step 1401 the CSI set is configured by the UE or the network. Subsequently, in step 1402 the transmission set is configured by the UE or the network. At step 1403, mobility management is performed by UE or the network. At step 1404, optionally, the candidate set is configured by UE or network. Each step of 1401, 1402, and 1404, there are different options as to how to configure the beam-set. For configuring CSI set 1401, the network-based CSI set configuration 1411 or the UE-based CSI set configuration 1412 can be used. Both procedures 1411 and 1412 perform the RRM management procedure for the purpose of configuring the CSI set at step 1413. RRM management procedure 1413 is performed on the higher layer, such as the RRC layer, measuring large-scale channel condition, such as path-loss, and RSRP. Similarly, for configuring transmission set 1402, the network-based transmission set configuration 1421 or the UE-based transmission set configuration 1422 can be used. Both procedures 1421 and 1422 perform the CSI measurement procedure for the purpose of configuring transmission set at step 1423. CSI measurement procedure 1423 is performed on the lower layer, such as the PHY, with finer granularity, and better accuracy as compared to the RRM measurement. CSI measurement procedure measures instantaneous channel variations. For configuring candidate set 1404, the network-based candidate set configuration 1441 or the UE-based candidate set configuration 1442 can be used. In one embodiment, network-based candidate set configuration 1442 is part of RRM procedure 1443. In another embodiment, network-based candidate set configuration 1442 is one separate procedure based on a RRM measurement 1444.

For a particular beam-set configuration procedure, the UE can choose different combinations. For example, the UE can perform CSI set configuration with network-based CSI set configuration 1411, followed by UE-based transmission set configuration 1422, and perform a network-based candidate set configuration as part of RRM procedure 1443. Other combinations can be configured, such as a UE-based CSI set configuration 1412, a UE-based transmission set configuration 1422 and a UE-based candidate set configuration 1441.

FIGS. 15A-15D are overall procedures for hybrid-implementations of network-based and UE based. The details of FIG. 14 could be combined into FIG. 15A-15D.

Figure 15A:
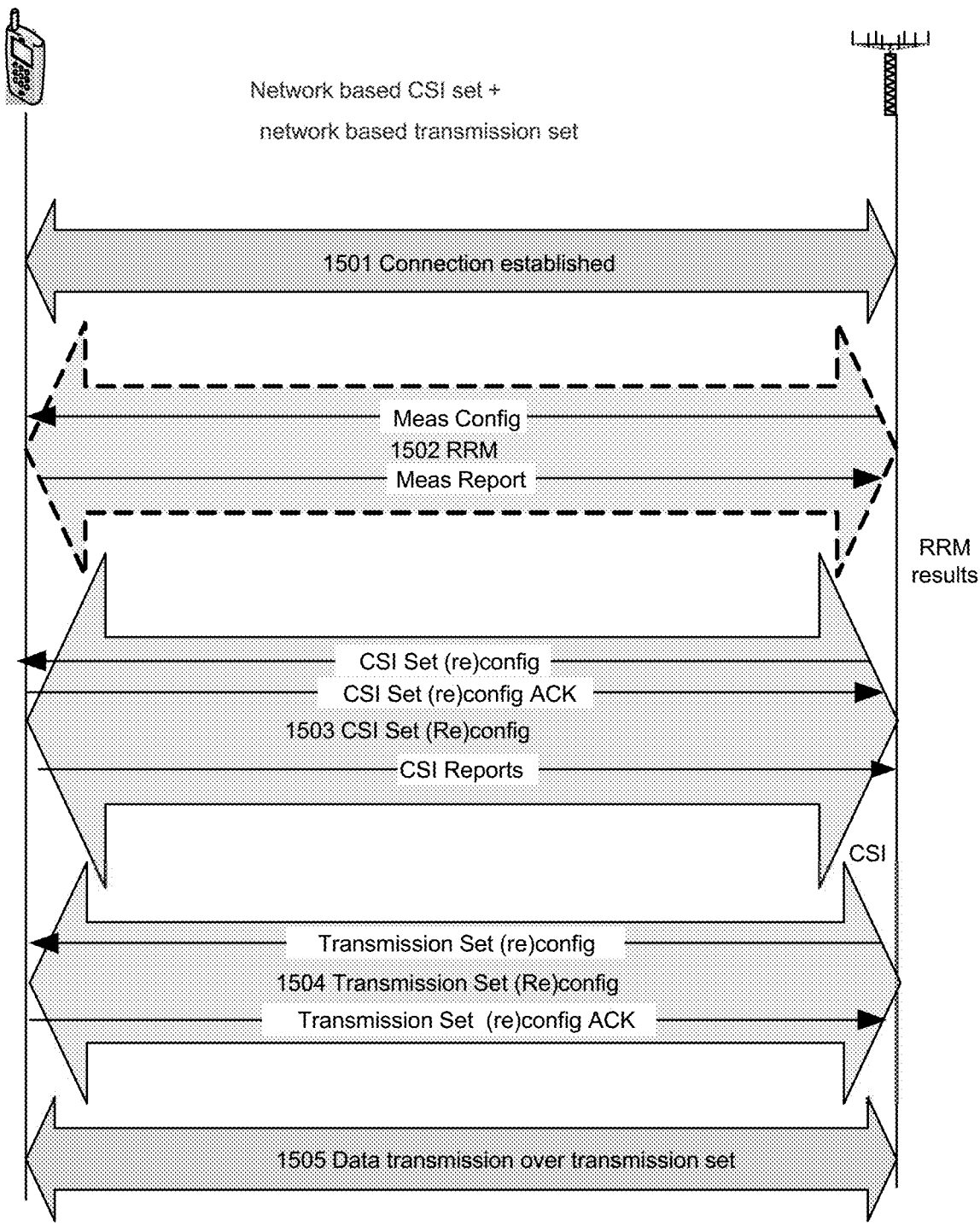
FIG. 15A is an overall procedure for hybrid-implementations where the CSI set is determined by the network and the transmission set is determined by the network.

In FIG. 15A, the CSI set is determined network based. And the transmission set is also determined network based. In step 1501, the connection is established between UE and NETWORK. In step 1502, network sends the configuration of RRM measurement to UE, and UE performs RRM measurements, and sends back the RRM measurement reports to network. Or UE transmits UL reference signal for network to perform RRM measurement. Based on RRM measurement results obtained by step 1502, the network determines the CSI set, and in step 1503, the network sends the configuration (reconfiguration) of CSI set to UE, optional, UE sends back the CSI set configuration ACK, and then, UE perform CSI measurement on CSI set, and sends back CSI report to network. Or UE transmits UL reference signal for network to perform CSI measurement. In step 1504, the network sends the configuration (reconfiguration) of transmission set to UE, and UE responds transmission set configuration ACK to network. After that, in step 1505, UE could perform data transmission and reception over transmission set. The person skilled in the art could know that, the steps 1502-1504 are not needed in turns, for example, after measurement in step 1502, the transmission set could be sent first, and then the CSI set by the network to UE.

Figure 15B:
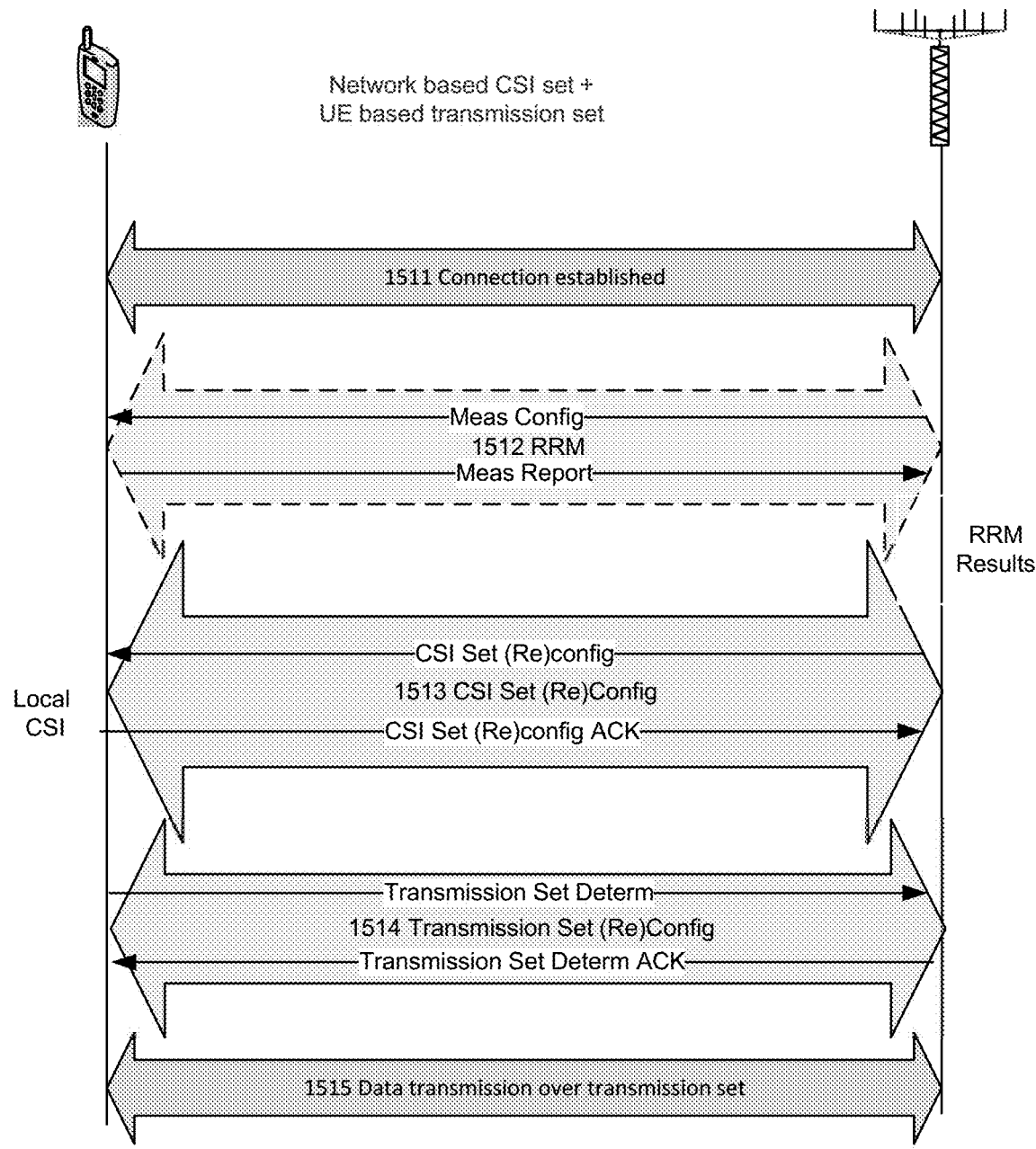
FIG. 15B, is an overall procedure for hybrid-implementations where the CSI set is determined by the network and the transmission set is determined by the UE.

In FIG. 15B, the CSI set is determined by network. And the transmission set is determined by UE. In step 1511, the connection is established between UE and network. In step 1512, network sends the configuration of RRM measurement to UE, and UE performs RRM measurements, and sends back the RRM measurement report to network. Or UE sends UL reference signals for network to perform RRM measurement. Based on RRM measurement results obtained by step 1512, the network determines the CSI set, and in step 1513, the network sends the configuration (reconfiguration) of CSI set to UE, optional, UE sends back the CSI configuration set ACK, and then, UE perform CSI measurement on CSI set. Then, and based on the local CSI measurement obtained from step 1513, UE determined the configuration (reconfiguration) of transmission set, and in step 1514, UE sends the configuration (reconfiguration) of transmission set to network, and network responds transmission set configuration ACK to UE or not. After that, in step 1515, UE could perform data transmission and reception over transmission set. The person skilled in the art could know that, the steps 1512-1514 are not needed in turns.

Figure 15C:
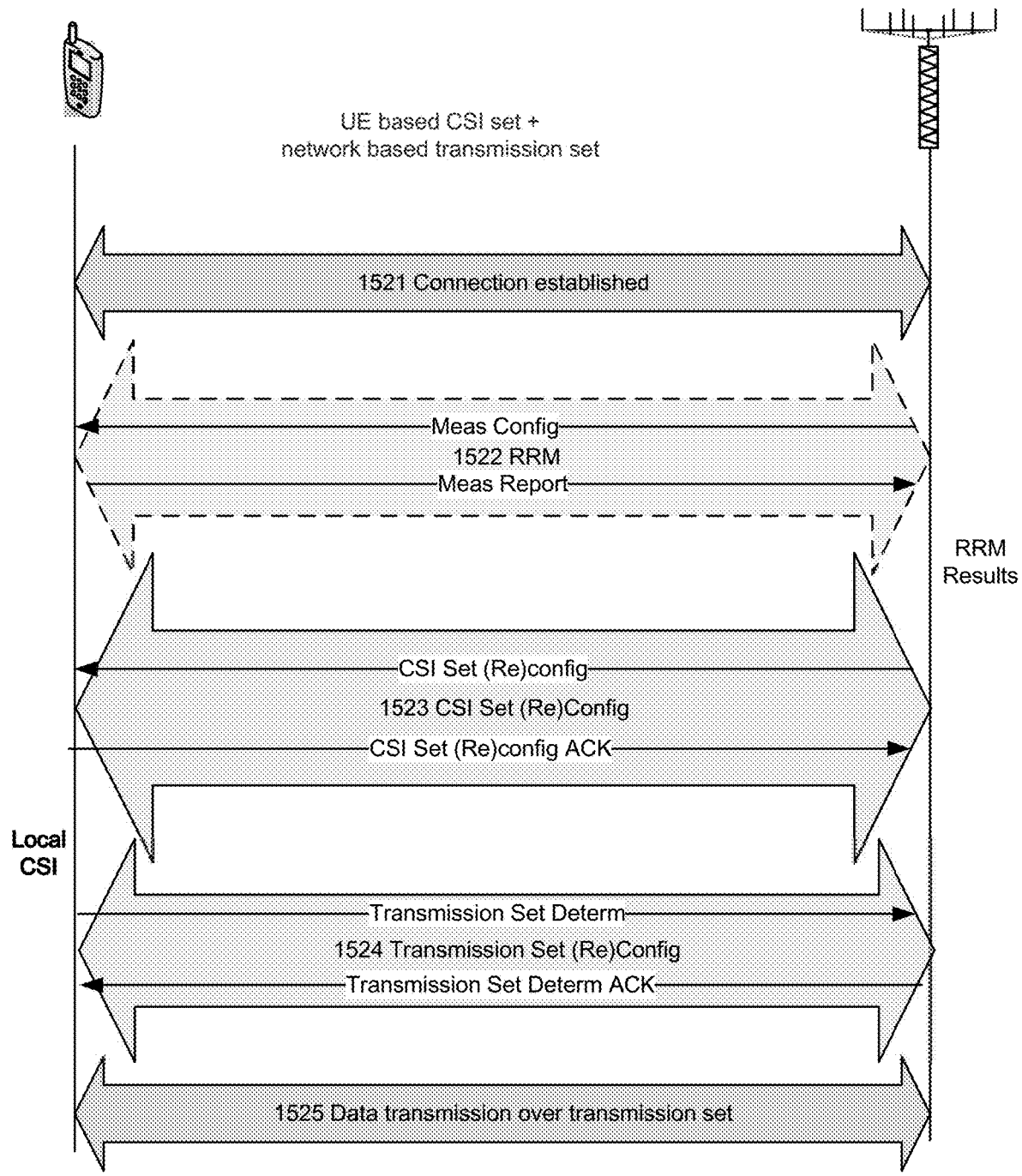
FIG. 15C, is an overall procedure for hybrid-implementations where the CSI set is determined by the UE and the transmission set is determined by the network.

In FIG. 15C, the CSI set is determined UE based. And the transmission set is determined network based. In step 1521, the connection is established between UE and network. In step 1522, network sends the configuration of RRM measurement to UE. Based on local RRM measurement results obtained by step 1522, the UE determines the CSI set, and in step 1523, the UE sends the configuration (reconfiguration) of CSI set to network, and network sends back the CSI configuration set ACK, and then, UE perform CSI measurement on CSI set, and sends back CSI report to network. Or UE sends the UL reference signals for network to perform CSI measurement. Based on the CSI reports or CSI measurement results obtained from step 1523, network determines the configuration (reconfiguration) of transmission set, and in step 1524, network sends the configuration (reconfiguration) of transmission set to UE, and UE responds transmission set configuration ACK to network or not. After that, in step 1525, UE could perform data transmission and reception over transmission set.

Figure 15D:
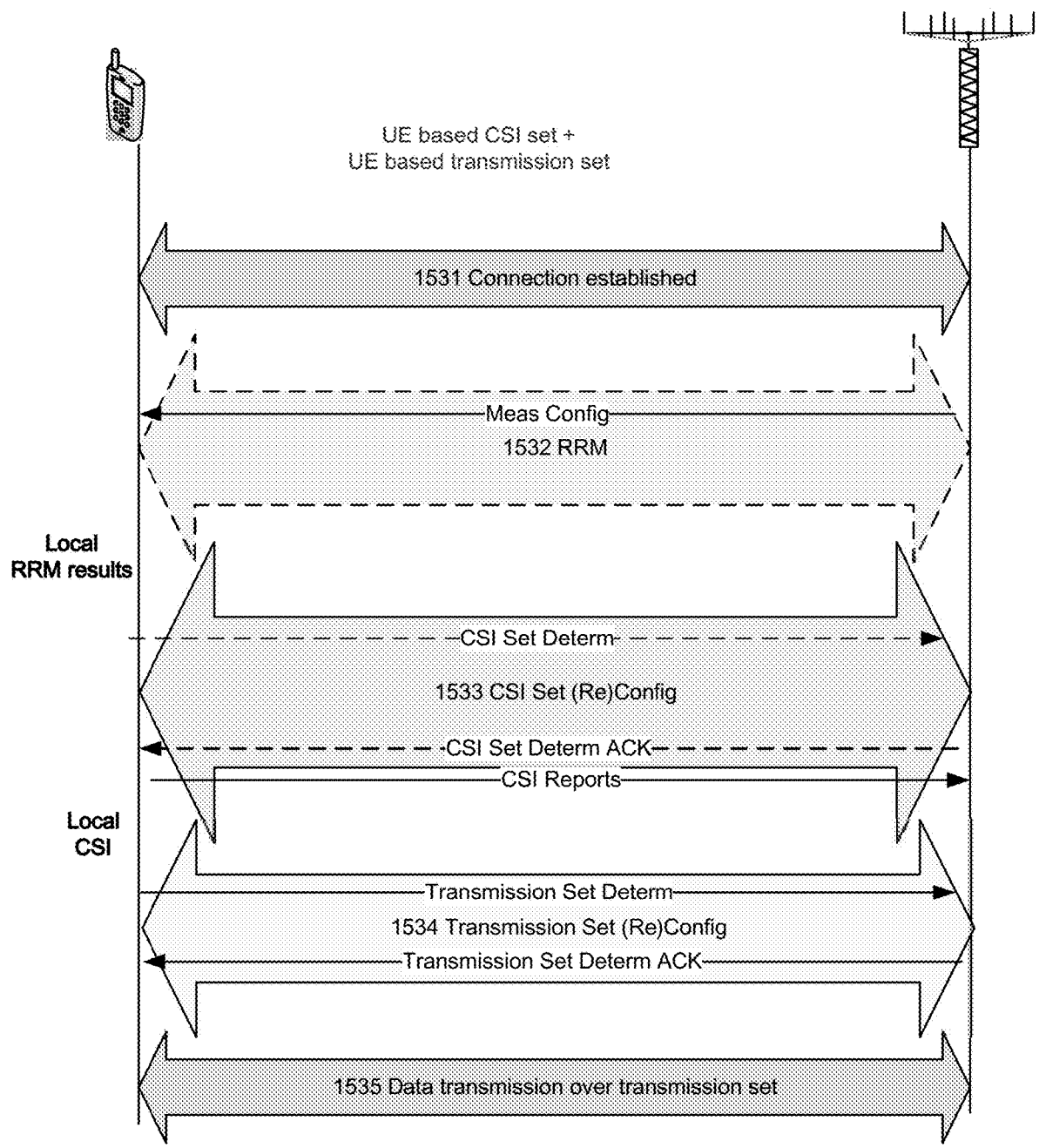
FIG. 15D, is an overall procedure for hybrid-implementations where the CSI set is determined by the UE and the transmission set is determined by the UE.

In FIG. 15D, the CSI set is determined UE based. And the transmission set is also determined UE. In step 1531, the connection is established between UE and network. In step 1532, network sends the configuration of RRM measurement to UE, and UE performs RRM measurements. Based on local RRM measurement results obtained by step 1532, the UE determines the CSI set, and in step 1533, the UE sends the configuration (reconfiguration) of CSI set to network, and network sends back the CSI set ACK, and then, UE perform CSI measurement on CSI set. Based on the local CSI measurement obtained from step 1533, UE determines the configuration (reconfiguration) of transmission set, and in step 1534, UE sends the configuration (reconfiguration) of transmission set to network, and network responds transmission set configuration ACK to UE or not. After that, in step 1525, UE could perform data transmission and reception over transmission set.

Figure 16:
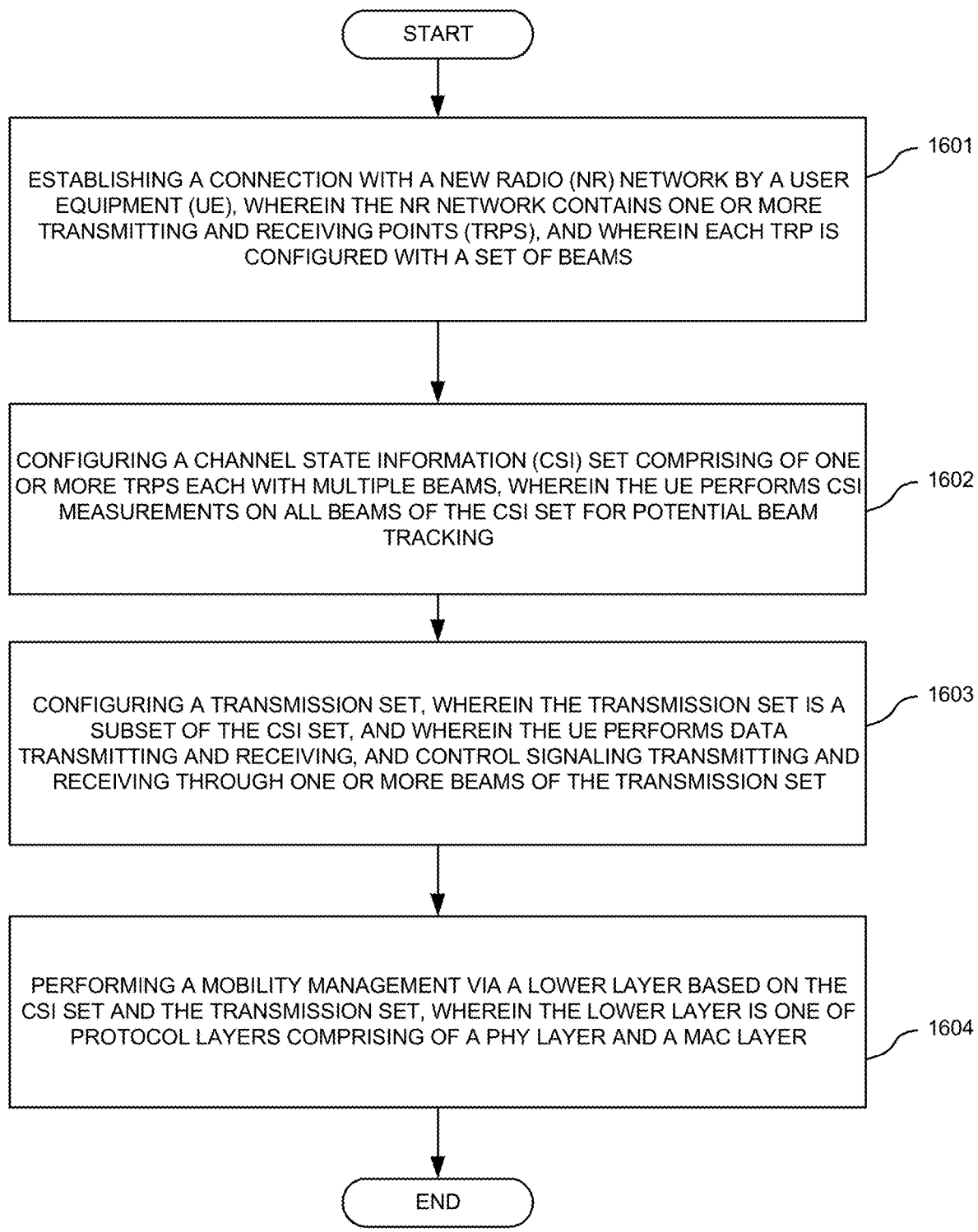
FIG. 16 is an exemplary flow chart for the mobility procedures in a NR network using beam tracking in accordance with embodiments of the current invention.

FIG. 16 is an exemplary flow chart for the mobility procedures in a NR network using beam tracking in accordance with embodiments of the current invention. At step 1601, the UE establishes a connection with a new radio (NR) network, wherein the NR network contains one or more TRPs, and wherein each TRP is configured with a set of beams. At step 1602, the UE configures a channel state information (CSI) set comprising one or more beams corresponding to one or more TRPs, wherein the UE performs CSI measurements on all beams of the CSI set for potential beam tracking or UE transmits UL reference signals for network to measurement CSI. At step 1603, the UE configures a transmission set, wherein the transmission set is a subset of the CSI set, and wherein the UE performs data transmitting and receiving, and control signaling transmitting and receiving through one or more beams of the transmission set. At step 1604, the UE performs a mobility management via a lower layer based on the CSI set and the transmission set, wherein the lower layer is one of protocol layers comprising of a PHY layer and a MAC layer.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   establishing a connection with a group of TRPs in a radio network by a user equipment (UE), wherein the TRPs group contain one or more TRPs, and wherein each TRP is configured with a set of beams;
   configuring a channel state information (CSI) set comprising of one or more beams corresponding to one or more TRPs, wherein the UE performs CSI measurements on the CSI set for potential beam tracking; and
   configuring a transmission set, wherein the transmission set is a subset of the CSI set, and wherein the UE performs data transmitting and receiving, and control signaling transmitting and receiving through one or more beams of the transmission set, and wherein the TRPs for data transmitting and receiving are dynamically changed by the UE or network for different transmission time interval (TTI) within the transmission set.

2. The method of claim 1, wherein performing a mobility management via a lower layer based on the CSI set, wherein the lower layer is one of protocol layers comprising of a PHY layer and a MAC layer.

3. The method of claim 1, wherein the control signaling includes at least one of signals comprising: a CSI report, a beam switching command, an acknowledgement for the beam switching command, a scheduling request (SR), a downlink (DL) assignment, and an uplink (UL) grant, preambles for random access.

4. The method of claim 1, wherein the CSI set is configured by a network entity based at least one of CSI-set information comprising: UE location information, UE RRM measurement reports, RRM measurement results, and the UE receives information about the CSI set from the network.

5. The method of claim 1, wherein the CSI set is determined by the UE based on at least one of CSI-set information comprising: UE location information, and UE RRM measurement results.

6. The method of claim 1, wherein transmission set is configured by the UE based on UE CSI measurement results.

7. The method of claim 1, wherein transmission set is configured by the network based on CSI report or the measurement results on UE UL reference signals, and the UE receives information about the transmission set from the network.

8. The method of claim 1, further comprising:
   configuring a candidate set by the UE or the network, wherein the candidate set is a super of one or more CSI sets including multiple TRPs each with multiple beams, and wherein the candidate set is used for mobility procedures and a CSI set determination, wherein when the candidate set in determined by the network, the UE receives information about the candidate set from the network.

9. A user equipment (UE), comprising:
a RF transceiver that communicates with one or more TRPs in a wireless network, wherein each TRP is configured with a set of beams;
a channel state information (CSI) set configurator that configures a channel state information (CSI) set comprising of one or more beams corresponding to one or more TRPs, wherein the UE performs CSI measurements on all beams of the CSI set for potential beam tracking;
a transmission set configurator that configures a transmission set, wherein the transmission set is a subset of the CSI set, and wherein the UE performs data transmitting and receiving, and control signaling transmitting and receiving through one or more beams of the transmission set, and wherein the TRPs for data transmitting and receiving from change dynamically in different transmission time interval (TTI) within the transmission set; and
a mobility manager that performs a mobility management via a lower layer based on the CSI set and the transmission set, wherein the lower layer is one of protocol layers comprising of a PHY layer and a MAC layer.

10. The UE of claim 9, wherein the UE performs CSI measurement and sends CSI reports set to the wireless network or the UE sends UL reference signals over lower layer on all beams of the CSI.

11. The UE of claim 9, wherein the control signaling includes at least one of signals comprising: a CSI report, a beam switching command, a scheduling request, a downlink (DL) assignment, and an uplink (UL) grant, preambles for random access.

12. The UE of claim 9, wherein the CSI set is configured by a network entity based at least one of CSI-set information comprising: UE location information, and UE RRM measurement reports, and the UE receives information about the CSI set from the network.

13. The UE of claim 9, wherein the CSI set is determined by the UE based on UE RRM measurement results.

14. The UE of claim 9, further comprising:
a RRM manager that performs a radio resource management (RRM) measurement procedure; and
a RRM reporter that reports RRM measurement results to the wireless network.

15. The UE of claim 9, wherein the transmission set is configured by the UE based on UE CSI measurement results.

16. The UE of claim 9, wherein the transmission set is configured by a wireless network entity base on UE location information, UE CSI measurement reports, or both.

17. The UE of claim 9, further comprising:
a candidate set configurator that obtains a candidate set, wherein the candidate set is a super of one or more CSI sets including multiple TRPs each with multiple beams, and wherein the candidate set is used for mobility procedures and a CSI set determination.

* * * * *